United States Patent [19]

Swidler

[11] 3,954,718
[45] May 4, 1976

[54] PROCESS FOR PREPARING POLYMERS CONTAINING CARBAMOYL-HYDROXAMATE GROUPS AND THE RESULTANT POLYMERS

[75] Inventor: Ronald Swidler, Palo Alto, Calif.
[73] Assignee: Stanford Research Institute, Menlo Park, Calif.
[22] Filed: Feb. 13, 1975
[21] Appl. No.: 549,786

[52] U.S. Cl. .................................... 260/77.5 AQ
[51] Int. Cl.² ............................................ C08G 18/32
[58] Field of Search ............................ 260/77.5 AQ

[56] References Cited
UNITED STATES PATENTS
3,216,842  11/1965  Skeist et al. ...................... 106/236

Primary Examiner—M. J. Welsh

[57] ABSTRACT

Polymers made up of chains, which contain and/or are cross-linked by carbamoyl hydroxamate groups, are prepared by the interaction of hydroxamic acid and isocyanate groups contained in monomeric or polymeric molecules. The resulting polymers are thermally degradable and have utility for the preparation of foamed polymers such as polyurethanes or polyureas. Upon heating, the carbamoyl hydroxamate links evolve $CO_2$ and cleave to produce amine and isocyanate groups. The isocyanate groups may be allowed to react with the amine groups, to form N, N' — disubstituted urea groups, or caused to react with other active hydrogen functions, such as hydroxyls, to form a variety of products, such as polyurethanes.

13 Claims, No Drawings

PROCESS FOR PREPARING POLYMERS CONTAINING CARBAMOYL-HYDROXAMATE GROUPS AND THE RESULTANT POLYMERS

BACKGROUND OF THE INVENTION

It is well known that hydroxamic acids react with isocyanates to produce carbamoyl hydroxamates, according to the equation

and that the latter compounds decompose spontaneously, when heated, according to the equation

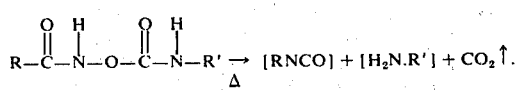

No suggestion has been found in the literature that the adduction reaction should be employed to make polymers containing carbamoyl hydroxamate groups or that the thermal instability of these groups could be taken advantage of in such polymers.

The utility of various hydroxamic acids and derivatives thereof as isocyanate precursors has been disclosed in a number of patents. U.S. Pat. No. 3,465,024 is directed to an improved process for preparing isocyanates by the thermal decomposition of acetyl hydroxamates and includes a discussion of several prior methods of forming isocyanates from hydroxamic acids or derivatives thereof. U.S. Pat. Nos. 3,268,542; 3,480,595; 3,507,900, 3,544,583; 3,560,492; 3,560,518; 3,813,365; 3,825,554 and 3,844,862 disclose various cyclic nitrile carbonates, sulfites and oxalates which are derivable from corresponding hydroxamic acids and which may be thermally decomposed to isocyanates utilizable in the preparation of polyurethanes. The U.S. Pat. No. 3,844,862 discloses the decomposition of cyclic nitrile carbonates in the presence of a polyol, to form foamed polyurethanes. The U.S. Pat. Nos. 3,480,595 and 3,560,492 disclose polymers containing cyclic nitrile carbonate (etc.) groups which can be reacted with polyols to form $CO_2$ (etc.) and thermoplastic polymers containing hydroxamate groups. The latter are said to decompose on mild heating to isocyanate and polyol groups which can be readducted subsequently. Hydrolysis of the cyclic nitrile carbonate (etc.) groups in the polymers to hydroxamic acid groups is also disclosed. Despite the inclusion of these latter alternatives within the bounds of single patents, the utilization of the reactivity of isocyanate and hydroxamic acid groups with each other in the formation or modification of polymers has not been contemplated.

It is an object of the present invention to provide polymers which are stable, non-toxic and readily handled under ordinary conditions but which can be utilized as source materials for isocyanate derived polymers, such as polyurethanes, polyureas, etc.

It is also an object to provide polymers of the preceding type containing a "built in" blowing agent, namely the $CO_2$ evolved upon decomposition of carbamoyl-hydroxamate groups.

A further object is to provide polymers which may be formed in situ or disposed as shaped solids capable of being altered to flowable or "tacky" compositions, simply by heating.

Yet another object is to provide cross-linked polymers which are controllably degradable to soluble compositions by heating.

All of the foregoing objects are attainable with polymers made up of chains which contain and/or are cross-linked by carbamoyl-hydroxamate groups.

SUMMARY DESCRIPTION OF THE INVENTION

Broadly, the process aspect of the present invention is the formation of carbamoyl-hydroxamate groups within or between polymer chains by adduction of isocyanate and hydroxamic acid groups contained in different monomeric or polymeric organic molecules, at least some of which are polyfunctional in I (isocyanate) or HA (hydroxamic acid) groups. In a composition aspect, the invention is any polymer made by the preceding process.

More precisely, the process of the present invention may be defined as the method of forming polymers containing carbamoyl-hydroxamate groups which comprises reacting a molecule of the formula $R(—NCO)_x$ with a molecule of the formula $R'(—CO—NH—OH)_y$; wherein R is an organic radical of valence $x$ which contains no —CO—NH—OH substituents, R' is an organic radical of valence $y$ which contains no —NCO substituents, $x$ and $y$ are integers, one of which has a finite value of at least 1 and the other of which has a finite value of at least 2; each —NCO group being attached to a different carbon in R and at least one carbon intervening between two adjacent —CO—NH—OH groups in R' when $y$ is greater than 1.

The foregoing definition includes reactions of monofunctional isocyanates or hydroxamic acids with polyfunctional hydroxamic acids or isocyanates, respectively. Either mono- or polyfunctional isocyanate/hydroxamic acid (I/HA) reactants may contain other reactive functions, such as olefinic unsaturation, hydroxyl, or carboxyl groups which do not detrimentally react with each other or with the I or HA groups under the conditions required for a useful rate of carbamoyl-hydroxamate group formation. Similarly, other types of substituents, such as halogen, phosphate, etc. which will impart spectial properties, such as fire retardancy, may be present in one or more of the I/HA reactants employed.

The character of the final polymer produced will generally not be highly dependent on the presence of carbamoyl-hydroxamate groups introduced (as links to side chains or terminal moieties) by reacting-in monofunctional I/HA compounds. Accordingly, monofunctional I/HA reactants are less important than their polyfunctional counterparts in the practice of the present invention.

The polyfunctional I/HA reactants employed may be monomers, prepolymers or uncured polymers. As used herein, the term "monomer" means any polymerizable organic compound not itself derivable from simpler molecules by any known type of polymerization reaction. I/HA monomers necessarily will contain at least two isocyanate or two hydroxamic acid groups, not attached to the same carbon. Suitable polyfunctional reactants may contain up to as many I or HA groups as it is possible to introduce by the method of synthesis employed. Monomeric reactants will generally not contain more than three or four such groups but polymeric reactants may have an I or HA group depending from each repeating unit in the polymeric chain. Thus, several thousand or more I or HA groups may be included.

It will be evident from the preceding discussion that the definition supra includes various embodiments of the invention which may be more precisely defined as follows:

The method of the invention in which one of $x$ and $y$ is 1 and the radical, R or R', which is polyvalent contains a polymeric chain, terminated at its ends by —NCO or —CO—NH—OH groups, respectively.

The method of the invention in which $x$ and $y$ each have a finite value greater than 1.

The method of the preceding embodiment in which one of molecules $R(-NCO)_x$ and $R'(-CO-NH-OH)_y$ is a monomer and the other is a monomer, prepolymer or polymer.

The method of the preceding embodiment in which each of molecules $R(-NCO)_x$ and $R'(-CO-NH-OH)_y$ is a monomer.

The method of the invention in which one of the molecules $R(-NCO)_x$ and $R'(-CO-NH-OH)_y$ is a monomer ($x$ or $y \geq 2$) and the other is a prepolymer containing a linear chain terminated at both ends by hydroxamic acid or isocyanate groups ($y$ or $x = 2$).

Corresponding composition embodiments of the invention are produced by practicing each of the foregoing method embodiments.

No basis for a sharp distinction between those polymeric molecules which are "prepolymers" and those which are uncured polymers inheres in the nature of polymers. The term "prepolymer" is used herein to denote polymeric molecules which do not contain so many repeating units as to be largely incapable of reacting at useful rates with other molecules of a comparable degree of polymerization (absent the action of a curing agent). The term includes those polymeric molecules commonly designated as dimers, trimers, allomers and oligomers. It also includes such lower polymers which have been chain extended with difunctional I or HA monomers.

The term "uncured polymers" is used herein to denote higher polymers which, in admixture, constitute a fluid or malleable resin produced by one or more stages of polymerization and capable of being hardened, strengthened or solidified by curing.

DETAILED DESCRIPTION OF THE INVENTION

Any otherwise suitable monomeric or polymeric reactant species containing an I or HA group can be reacted, at some stage of polymer synthesis, with another molecule containing an HA or I group, respectively, thereby introducing carbamoyl-hydroxamate groups in the final polymer structure.

The stage or stages at which the adduction reaction is utilized and the specific types of reactants employed are largely dependent upon considerations which will be apparent to polymer chemists. An important consideration, of course, is that the reaction conditions employed, at any preparation stage including or subsequent to the adduction reaction, must not be so severe or of such duration as to result in thermal, solvolytic or hydrolytic destruction of an intolerably large proportion of the carbamoyl-hydroxamate groups present.

The half-life of the carbamoyl-hydroxamate groups in a given source polymer or prepolymer at any preselected temperature can be estimated in the following manner, (assuming that the proportion of $CO_2$ formed but consumed in side reactions will be nil or essentially constant). A first test sample is heated, at a temperature sufficiently high that rapid $CO_2$ evolution occurs, until no more $CO_2$ is evolved and the total evolved volume of $CO_2$ at standard conditions is measured. A sample of identical composition and weight is then heated at the temperature in question until the volume of $CO_2$ evolved is half of that obtained from the first sample (or until it is apparent that the half-life will be longer than required for the purpose at hand). The half-lives found at two or more different temperatures may be used in known methods to estimate the half-life of the same material at other temperatures.

It is also important to know or to be able to estimate the rate of decomposition of the carbamoyl-hydroxamate groups in a given product polymer at contemplated service temperatures. Similarly, the minimum temperature required to cleave any preselected portion of such groups in a preselected time period must be known for applications in which a product polymer is deliberately to be altered to a flowable or tacky composition by heating.

Useful isocyanate starting materials for the practice of the present invention are organic isocyanates in general. Thus, mono- or polyfunctional, monomeric or polymeric, substituted or unsubstituted, aliphatic, alicyclic, aromatic, heteroaliphatic and heterocyclic isocyanates may be employed.

A considerable variety of individual isocyanates are known and skilled polymer chemists will require no extensive cataloging of them. A few illustrative types of isocyanates may be mentioned, however. These are as follows:

1. perchlorinated, monochlorinated and unchlorinated aromatic mono-, di- and triisocyanates such as are disclosed in U.S. Pat. No. 3,277,138;

2. isocyanates derivable by dehydration and rearrangement of 1- amino-cyclohexanecarbohydroxamic acid hydrohalides, the latter being disclosed in U.S. Pat. No. 3,703,542;

3. diisocyanato urethanes, such as are described in U.S. Pat. No. 3,813,380;

4. polymethylene diisocyanates, such as those described in U.S. Pat. Nos. 2,394,597, 3,465,024 and 3,840,572;

5. isocyanates derivable by heating the cyclic nitrile sulfites of U.S. Pat. No. 3,268,542; for example, 1,3-diisocyanto tetrahydronopthalene, 3-hydroxy- or 3-nitro-1,4-diisocyanato benzene, 4-bromo-1,3,5-triisocyanato benzene and 2,2'-stilbene diisocyanate;

6. cycloaliphatic monoisocyanates derivable by heating the cyclic nitrile sulfites of U.S. Pat. No. 3,544,583; for example, 2,4-cyclopentadienylisocyanate, 4-fluoro-cyclohexylisocyanate and 2-isopentoxy-cyclononylisocyanate;

7. ethylenically-unsaturated mono- or diisocyanates derivable by heating the cyclic nitrile sulfites of U.S. Pat. No. 3,560,492; for example, p-vinyl phenylisocyanate, vinylisocyanate and transvinylenediisocyanate;

8. isocyanate group-containing polymers derivable by heating the homo- and copolymers of ethylenically unsaturated cyclic nitrile carbonates and oxalates, the latter polymers being disclosed and claimed in U.S. Pat. Nos. 3,480,595, 3,652,507 and 3,813,365; for example, the thermoplastic polyisocyanate formed upon heating a copolymer of styrene and p-vinylbenzonitrile carbonate and/or acrylonitrile carbonate.

The process of preparing isocyanates of the foregoing types (5) through (8) by heating cyclic nitrile carbonates, etc. is disclosed in detail (and claimed) in U.S. Pat. No. 3,507,900. A process for making difunctional cyclic nitrile carbonates by the reaction of dihydroxamic acids and phosgene is disclosed (and claimed) in U.S. Pat. No. 3,825,554.

Other illustrative types of isocyanates useful in the practice of the present invention are:

9. isocyanate group-containing prepolymers and high polymers produced by the interaction of isocyanate and isocyanate-reactive functional groups in one or more monomer species, an excess of isocyanate groups being provided by the monomers employed; the isocyanto urethanes of type (3.) preceding are an example;

10. heteroaliphatic and heterocyclic isocyanates, such as are derivable — by known methods of converting primary amine groups to isocyanate groups — from amine compounds in which acyclic and cyclic hydrocarbyl moieties are interrupted by or linked through —O—, —S—,

—N=, or other hetero atoms; for example, β-ethoxy-n-amylamine, β-phenoxyethylamine, β-(methylthio) ethylamine, di-(α-aminopropyl) ether, 3-amino diphenylether, di-(β-aminoethyl) sulfide, ethyl m-aminophenyl sulfide, 2-aminothiophene, 1-furyl-2-aminopropane, 2-thenylamine, 2,4-diamino-5-phenylthiazole, 3,5-diaminopyridine and 2,4'-diamino-diphenyl sulfide; (for amine to isocyanate conversion methods see pp. 460–1, Wagner and Zook, Synthetic Organic Chemistry, Wiley, N.Y., N.Y. 1953);

11. isocyanates derivable by known methods from polyaminohydrocarbons such as, for example, those which are prepared by ammonolysis of chlorinated polyolefins under pressure in polar solvents such as ethanol or dimethylformamide;

12. isocyanates derivable, by the process of U.S. Pat. No. 3,465,024, from acetate esters of mono- and poly hydroxamic acids or, by the process of U.S. Pat. No. 2,394,597, from dihydroxamic acids of their metal salts.

Preferred specific isocyanate reactants are the commercially available polyfunctional aromatic and aliphatic isocyanates. These are well known to polymer chemists and include modified isocyanates. A listing will be found at page 46 of Vol. 12 of The Encyclopedia of Chemical Technology, Kirk-Othmer, 2d edition.

Useful hydroxamic acid starting materials for the practice of the present invention are organic hydroxamic acids in general, including mono- or polyfunctional, monomeric or polymeric, substituted or unsubstituted, aliphatic, alicyclic, aromatic, heteroaliphatic and heterocyclic species.

Since carboxylic acids can often be converted, as anhydrides, acyl halides, lower alkyl esters or as amides, to the corresponding hydroxamic acids (see The Hydroxamic Acids; H. L. Yale, Chem. Reviews, 33, 225–231 (1943)) the spectrum of useful hydroxamic acids is comparable in breadth to the spectrum of known carboxylic acids — which is broad indeed. Hydroxamic acids can also be prepared by the hydrolysis of cyclic nitrile carbonates derivable from reactions of aliphatic lactones with hydroxylamine and then with phosgene and a base, as disclosed in U.S. Pat. No. 3,480,595.

Illustrative of the monomeric hydroxamic acids which are useful in the practice of the present invention are the following:

1. cinammohydroxamic acid and pyruvylohydroxamic acid;

2. monofunctional acids such as R—CO—NH—OH, where R is cyanomethyl, cyclohexyl, 3-carboxy-propyl, 4-cyclohexenyl, 3-nitro-4-cyclooctenyl, 2,4-cyclopentadienyl, bicyclo [2.2.1] hepta-5-en-2-yl, vinyl, isopropyl, propynyl, benzyl, phenyl m-tolyl, 6-cyano-2-pyridyl or 4-phenoxyphenyl; also, perfluoroalkylhydroxamic acids derivable from the perfluoroalkylcarboxamides or nitriles disclosed in U.S. Pat. No. 3,847,964, or by reaction with hydroxylammonium chloride or with hydrogen peroxide;

3. polyfunctional acids such as R'(—CO—NH—OH)$_2$, where R' is methylene, vinylene, 2,4-dimethyl-1,6-hexylene, 2-chloro-1,9-nonanylene, cyclohexylene, thenyl, m-phenylene 1,2-dibromo-1,2-ethylene or 3,4-methylenedioxy-o-phenylene;

4. (The suffix "dihydroxamic acid" is used herein in the same sense that the term "dicarboxylic acid" is conventionally used, and does not mean diacylated hydroxylamines

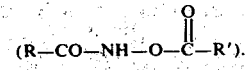

Similarly, "trihydroxamic acid" does not mean a triacylated hydroxylamine, herein.) 2,5-pyrazinedihydroxamic acid, 1,3,5-benzene-trihydroxamic acid, p,p'-azobenzenedihydroxamic acid, 1,3,5-naphthotrihydroxamic acid, 2,2'-stilbenedihydroxamic acid, benzenehexahydroxamic acid, thiodipropiohydroxamic acid S(CH$_2$—CH$_2$—CO—NHOH)$_2$, and 3-oxo-1,5-pentanedihydroxamic acid;

5. acetylene dihydroxamic acid,

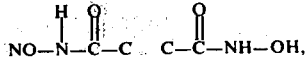

the preparation of which (from acetylene dicarboxylic acid or lower alkyl esters thereof) and use thereof should be undertaken with due caution.

Illustrative of the polymeric hydroxamic acids which are useful in the practice of the invention are:

1. prepolymers, such as polycondensation products of difunctional hydroxy or amino compounds with an excess of a difunctional carboxylic acid, in which terminal carboxyl groups have been converted to hydroxamic acid groups; also, hydroxamic acid group-terminated prepolymers derived from (a) carboxyl terminated prepolymers such as those of the formula

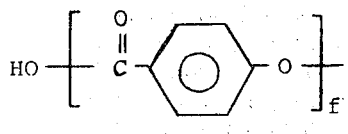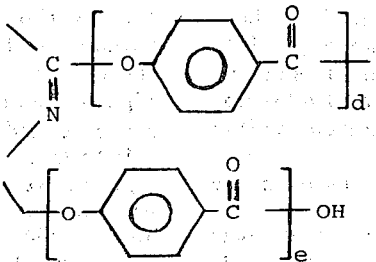

wherein *d*, *e* and *f* independently are integers of from 2 to about 40, as disclosed in U.S. Pat. No. 3,816,417; or
  b. fluorinated polyethers having terminal —CF$_2$—COOH groups and containing from 2 to 100 —CF$_2$O—, —C$_2$F$_4$O— and/or —C$_3$F$_6$—O— groups, as disclosed as U.S. Pat. No. 3,847,978;
2. high polymers derived from polyacrylic acids or partially hydrolyzed polyacrylamides by replacement of carboxylic acid groups with hydroxamic acid groups;
3. high polymers derived by hydrolysis of cyclic nitrile carbonate, sulfite or oxalate groups in addition polymers formed from corresponding unsaturated monomers, such as are disclosed in U.S. Pat. Nos. 3,480,595; 3,560,492 and 3,813,365;
4. high polymers derived from hydrolyzed styrene/-maleic anhydride co-polymers by replacement of carboxyl groups with hydroxamic acid groups.

Reactive diluents

Reactive diluents may be incorporated in the compositions of the present invention in accordance with conventional practices. This is one method of controlling the relative proportion of the (thermally cleavable) carbamoyl-hydroxamate groups in the final product. It is also commonly used as a means of modifying such end-product properties as hardness and resistance to solvents or chemicals.

Isocyanate groups react with essentially all active hydrogen compounds and hydroxamic acids can be expected to react with oxirane groups, at least at elevated temperatures. Consequently, the choice of reactive diluents which will remain present as such up to the curing stage, rather than reacting-in at an earlier stage, will be quite limited unless the concentration of unconverted I/HA groups in the uncured product (a "B stage resin", for example) is relatively low. However, the composition of a carbamoyl-hydroxamate group-containing resin may be such that curing can be effected through other reactive functions and does not depend on the presence of residual I or HA groups. Examples of such other reactive functions are olefinic or acetylenic unsaturation, carbonyl groups, cyclic ether groups, nor-bornylene groups, diazo groups, isocyanide groups and oxirane groups. Reactive diluents which will react with themselves or with other components of the resin under the influence of a curing agent suitable for such groups may thus be employed to advantage.

Other additives

Other additives, such as plasticizers, extenders of fillers may also be employed in the compositions of the present invention, in accordance with conventional practices.

How the adduction reaction is carried out

Broadly, the considerations which will determine the choice of medium, reactant functionality, stages of polymerization at which adduction is effected, relative concentration of the resultant carbamoyl-hydroxamate groups in the final product, and so on, will be apparent to polymer chemists. However, for the benefit of those less familiar with the contents of the polymer chemist's "bag of tricks", reference may be had to the following:
  The Encyclopedia of Polymer Science and Technology (Interscience, 1964–71);
  Polymer Handbook, Brandop and Immergut (Interscience, 1966);
  Preparative Methods of Polymer Chemistry, 2d. ed.; Sorenson and Campbell, (Interscience, 1968).

The latter reference contains over 400 illustrative preparations of specific polymers from over 25 different types of monomers.

The adduction reaction, when carried out with a specific pair of I/HA reactants, defined earlier herein as R(—NCO)$_x$ and R'(CO.NH.OH)$_y$, ideally will be representable by one of the following equations:

A. x = 1 and y ≥ 2
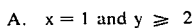

B. x ≥ 2, y = 1
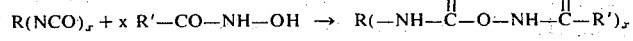

C. x = 2 = y ≥ a > b and both are integers
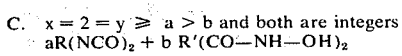
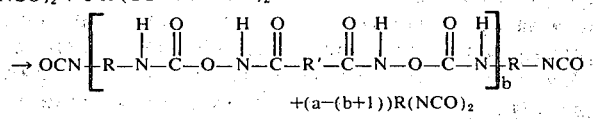

+(a−(b+1))R(NCO)$_2$

D. $x = 2 = y \quad a < b$
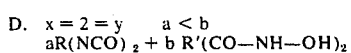
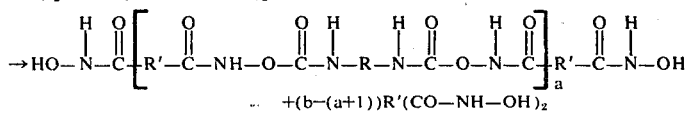

E. $x = 2 = y \quad a = b$
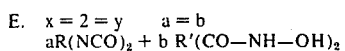
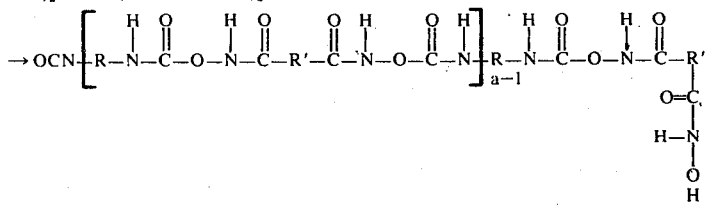

and so on, for $x = 2$, $y > 2$; $x > 2$, $y = 2$ and $x > 2$, $y > 2$.

The scope applicable to the radicals R and R' in the preceding equations has been made amply clear earlier herein.

Depending upon the thermal stability of the carbamoyl-hydroxamate groups in the particular prepolymer or polymer to be formed, the isocyanate groups in $R(NCO)_x$ may be provided to the reaction by the thermal decomposition "in situ" of such isocyanate source-moieties as phenol-blocked isocyanate groups or cyclic nitrile carbonates, sulfites, etc.

The basic requirement for the adduction is that the I and HA reactants be brought together as components of a melt or as a suspension or dispersion in an inert medium, preferably a medium in which at least one of the reactants is soluble. By "inert" is meant that the medium does not detrimentally react to an intolerable degree with either reactant or with the product(s). Since the hydroxamic acids — particularly the polyfunctional acids — are often difficultly soluble in all but the most polar solvents, normally liquid solents such as DMF (dimethyl formamide), DMSO (dimethyl sulfoxide), N-methyl pyrollidene, THF (tetrahydrofuran), ethyl or amyl acetate, methyl ethyl ketone, Cellosolve acetate (2-ethoxyethyl acetate) and the like will generally be employed. DMF is an example of a solvent which can react with isocyanates but is inert enough to be employed as a medium for the adduction reaction.

Both isocyanates and hydroxamic acids are prone to enter into a variety of side reactions. It is therefore highly desirable to carry out the reaction at the lowest temperature at which the reaction between a given pair of I/HA reactants proceeds at a satisfactory rate. Temperatures within the range of about 25°C to about 80°C will generally be found suitable and a range of about 35°–50°C is preferred.

Similarly, strongly acid or alkaline conditions should generally be avoided. The reactions of isocyanates with active hydrogen compounds are catalyzed by acids and bases, particularly the latter, but side reactions which compete with adduction will also be catalyzed and may even be favored under such conditions. Since non-aqueous media will generally be preferred for the adduction reaction, pH will not ordinarily be a meaningful parameter. [However, the acid/base content of the reaction mixture preferably is such that the pH resulting immediately upon dissolution of a portion of the mixture in an equal volume of water will be within the range of from about 7.5 to 9.0.] Since hydroxamic acids are generally only weakly ionized, base addition to maintain a satisfactory acid/base balance will ordinarily not be required.

Reaction times may vary widely, depending on the relative reactivities of the HA reactants, temperature, the presence of catalysts, the degree of polymerization desired, solvent effects, etc. In general, however, reaction times of from ⅓ to 24 hours will be satisfactory and in many instances, several hours will suffice.

The product polymer may be used in the solvent in which formed or recovered by conventional procedures such as stripping in vacuo, precipitation by addition of a non-solvent or freezing out. When the product polymer is insoluble and phase separates as formed, simple filtration or centrifugation may be resorted to.

Agitation, as by pumping, stirring or shaking, may be used to advantage up to the point where viscosities become excessive.

Polymerization steps involving reactions other than adduction between isocyanate and hydroxamic acid groups may be carried out according to the nature of the reactive groups — such as olefinic double bonds, oxirane groups, aromatic hydrogens, carbonyl groups, etc., which are available in the reactants. Procedures and catalysts appropriate to such groups may be employed. In all cases, conditions which are not determinental to subsequent adduction or conducive to carbamoyl-hydroxamate decomposition should be employed.

EXAMPLES

1. Preparation of dihydroxamic acids from dicarboxylic acids: general procedure.

Two moles of hydroxylamine hydrochloride are dissolved in absolute methanol and a solution of 2.3 moles of KOH in twice its weight of absolute methanol is added, while the temperature is kept at 20°C. The precipitated KCl is filtered out. One mole of the diethyl ester of the dicarboxylic acid is stirred with the filtrate at room temperature. More KCl precipitates and is filtered out. The corresponding dihydroxamic acid is precipitated with acetic acid (a stronger acid).

Specific dihydroxamic acids. The following diacids were made by the above procedure:

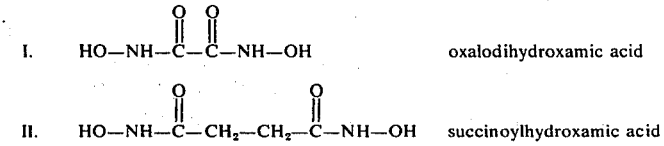

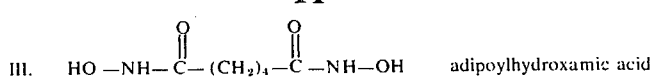

III. adipoylhydroxamic acid

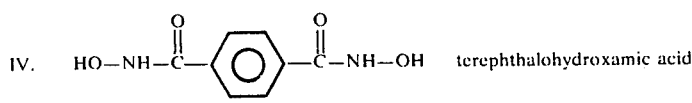

IV. terephthalohydroxamic acid

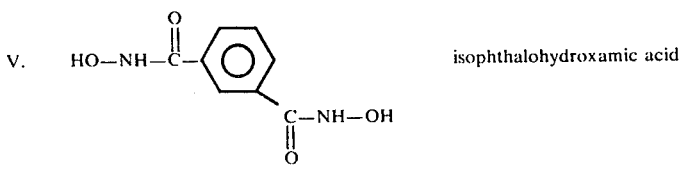

V. isophthalohydroxamic acid

2. Preparation of a polyglycol/isocyanate prepolymer.

100 grams (0.0498 moles) of a polypropylene glycol, having a molecular weight of about 2000 ($PPG_{2010}$; Dow Chemical Co.) and 17.5 grams (0.0995 moles; ~2:1 ratio) of 2,4-tolylene diisocyanate were heated together in bulk for 2 hours at 115°C. The resulting viscous prepolymer was diluted with tetrahydrofuran to 60% by wt. solids and retained as a stock solution of isocyanate-terminated prepolymer.

3. Chain extension with hydroxamic acids.

a. 0.004 moles of prepolymer (16.7 grams stock solution) and 0.004 moles of adipoylhydroxamic acid dissolved in 10 grams of DMF was heated under nitrogen with stirring for 30 minutes at 50°C. The reaction mixture was then a very viscous solution. A film was cast onto a glass plate and dried in vacuum. The dry film of polymer (estimated molecular weight about 200,000) was clear and was carefully peeled off the glass. Upon heating slowly, pin-prick bubbling was observed at 85° and foaming at 100°C. At 125° the bubbles collapsed, leaving a tacky residue which would adhere well to paper or glass pressed against it.

b. No viscosity increase resulted when oxalohydroxamic acid was contacted in the preceding manner with another portion of the prepolymer solution of Example 2. Further tests were made, using temperatures up to 100°C and DBTDL (dibutyl tin dilaurate) catalyst over periods of several hours. The films obtained with the product mixture were tacky and unusable.

c. Terephthalohydroxamic acid was insoluble in DMF and was therefore finely ground and mixed with the prepolymer solution as was. Otherwise the procedure (a) was followed. Even after several hours of heating and stirring very little of the acid had dissolved and no viscosity buildup resulted. It was evident that a better solvent, such as hexamethyl phosphoramide, was needed to effect adduction between the I/HA reactants used in this experiment. (The reaction mixture formed a tacky film, on glass, and gassed some at 130°C.)

d. Isophthalohydroxamic acid, 0.004 moles, in 10 ml of DMF, was stirred under nitrogen at 50°C with 0.004 moles (16.7 g stock solution) of prepolymer. After ten minutes a gel formed. The gel proved insoluble in DMF and was broken up in a blender with water and dried under vacuum. A piece of the granular, dried gel, where heated slowly to 135°C, gassed vigorously and gave a tacky residue.

I claim:

1. The method of forming polymers containing carbamoyl-hydroxamate groups which comprises reacting a molecule of the formula $R(-NCO)_x$ with a molecule of the formula $R'(-CO-NH-OH)_y$; wherein R is a monomeric or polymeric organic radical of valence $x$ which contains no —CO—NH—OH substituents, R' is a monomeric or polymeric organic radical of valence $y$ which contains no —NCO substituents, $x$ and $y$ are integers, one of which has a finite value of at least 1, and the other of which has a finite value of at least 2; each —NCO group being attached to a different carbon in R and at least two carbons intervening between two adjacent —CO—NH—OH groups in R' when $y$ is greater than 1,
and either
at least one of R and R' is a polymeric radical
or
both R and R' are monomeric radicals and each of $x$ and $y$ has a finite value of at least 2;
said reaction being carried out in the absence of functional groups so reactive with isocyanate or hydroxamic acid groups as to be detrimental to formation of carbamoyl-hydroxamate groups at a useful rate, under the conditions required to effect said reaction.

2. The method of claim 1 in which one of x and y is 1 and the radical, R or R', which is polyvalent contains a polymeric chain, terminated at its ends by —NCO or —CO—NH—OH groups, respectively.

3. The method of claim 1 in which x and y each have a finite value greater than 1.

4. The method of claim 3 in which one of molecules $R(-NCO)_x$ and $R'(-CO-NH-OH)_y$ is a monomer and the other is a monomer, prepolymer or polymer.

5. The method of claim 3 in which each of molecules $R(-NCO)_x$ and $R'(-CO-NH-OH)_y$ is a monomer.

6. The method of claim 4 in which the molecule which is not a monomer is a prepolymer containing a linear chain terminated at both ends by isocyanate or hydroxamic acid groups, the same in both occurrences.

7. A carbamoyl-hydroxamate group-containing organic polymer made by the method of claim 1.

8. The method of claim 1 wherein the reactant $R'(-CO-NH-OH)_y$ is adipoylhydroxamic acid.

9. The method of claim 8 wherein the reactant $R(-NCO)_x$ is an isocyanate terminated polyglycol/isocyanate prepolymer.

10. The polymer produced by the method of claim 9.

11. The method of claim 1 wherein the reactant $R'(-CO-NH-OH)_y$ is isophthalohydroxamic acid.

12. The method of claim 11 wherein the reactant $R(NCO)_x$ is an isocyanate terminated polyglycol/isocyanate prepolymer.

13. The polymer produced by the method of claim 12.

* * * * *